US012525109B2

(12) United States Patent
Yamazaki et al.

(10) Patent No.: US 12,525,109 B2
(45) Date of Patent: Jan. 13, 2026

(54) WARNING METHOD AND WARNING SYSTEM

(71) Applicant: Nissan Motor Co., Ltd., Yokohama (JP)

(72) Inventors: Shota Yamazaki, Kanagawa (JP); Kentarou Yuge, Kanagawa (JP); Takanori Kai, Kanagawa (JP); Takeshi Satoh, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 63 days.

(21) Appl. No.: 18/699,909

(22) PCT Filed: Nov. 1, 2021

(86) PCT No.: PCT/JP2021/040242
§ 371 (c)(1),
(2) Date: Apr. 10, 2024

(87) PCT Pub. No.: WO2023/073988
PCT Pub. Date: May 4, 2023

(65) Prior Publication Data

US 2024/0404385 A1 Dec. 5, 2024

(51) Int. Cl.

*G08B 21/02* (2006.01)
*G08B 21/18* (2006.01)
*G08B 21/22* (2006.01)

(52) U.S. Cl.

CPC .......... *G08B 21/02* (2013.01); *G08B 21/182* (2013.01); *G08B 21/22* (2013.01)

(58) Field of Classification Search

CPC ....... G08B 21/02; G08B 21/182; G08B 21/22
USPC .......................................................... 340/573.1
See application file for complete search history.

(56) References Cited

U.S. PATENT DOCUMENTS 6,417,774 B1 * 7/2002 Hibbs .................... G08B 19/02 340/584
10,154,401 B2 * 12/2018 Olesen ................. G08B 25/016
11,475,751 B1 * 10/2022 Lee ...................... A61B 5/7282
12,062,441 B2 * 8/2024 Arthur ........... G06Q 10/063114
(Continued)

FOREIGN PATENT DOCUMENTS

JP 5022506 B1 9/2012
JP 2015-54224 A 3/2015
(Continued)

*Primary Examiner* — Zhen Y Wu
(74) *Attorney, Agent, or Firm* — GLOBAL IP COUNSELORS, LLP

(57) ABSTRACT

A warning system includes an information acquisition unit, a risk degree calculation unit and an alarm. The information acquisition unit acquires a heart rate and an acceleration, which are items of biological information pertaining to a monitored person, as well as temperature and humidity, which are items of environment information pertaining to surroundings of the monitored person. The risk degree calculation unit calculates a degree of risk relating to heatstroke in the monitored person based on the heart rate, acceleration, temperature, and humidity. The alarm issues a warning based on an extent of the calculated degree of risk. The alarm modifies a scope of the warning according to the extent of the degree of risk.

8 Claims, 3 Drawing Sheets

(56) References Cited

U.S. PATENT DOCUMENTS

| | | | | |
|---|---|---|---|---|
| 2012/0165616 | A1* | 6/2012 | Geva | A61B 5/0022<br>600/300 |
| 2013/0162428 | A1* | 6/2013 | Baines | B61L 23/06<br>340/539.12 |
| 2013/0222139 | A1* | 8/2013 | Gouge | A61B 5/6801<br>340/573.1 |
| 2017/0245783 | A1* | 8/2017 | Schumacher | A61B 5/6803 |
| 2017/0317911 | A1* | 11/2017 | Carr | H04L 43/10 |
| 2017/0323550 | A1* | 11/2017 | Patil | G08B 5/22 |
| 2017/0372216 | A1* | 12/2017 | Awiszus | A61F 11/06 |
| 2018/0108236 | A1* | 4/2018 | Kanukurthy | G06Q 50/265 |
| 2018/0214028 | A1* | 8/2018 | Zhang | A61B 5/4318 |
| 2019/0073618 | A1* | 3/2019 | Kanukurthy | G08B 21/02 |
| 2019/0122517 | A1* | 4/2019 | Kimura | G08B 21/02 |
| 2020/0016439 | A1* | 1/2020 | Perner | G08B 21/02 |
| 2021/0077836 | A1* | 3/2021 | Ferraro | G01N 33/0063 |
| 2021/0134133 | A1* | 5/2021 | Fellows | H04W 4/021 |
| 2021/0233654 | A1* | 7/2021 | Arthur | G16H 40/63 |
| 2021/0386384 | A1* | 12/2021 | Hirano | A61B 5/7275 |
| 2024/0212470 | A1* | 6/2024 | Shinoda | G08B 21/0446 |

FOREIGN PATENT DOCUMENTS

| | | | |
|---|---|---|---|
| JP | 2020-13493 | A | 1/2020 |
| JP | 2021-461 | A | 1/2021 |

* cited by examiner

WARNING METHOD AND WARNING SYSTEM

CROSS-REFERENCE TO RELATED APPLICATIONS

This application is a U.S. national stage application of International Application No. PCT/JP2021/040242, filed on Nov. 1, 2021.

BACKGROUND

Technical Field

The present invention relates to a warning method and a warning system in which: a degree of risk relating to any poor physical health, illness, or injury of a monitored person is calculated; and a warning is issued based on the degree of risk.

Background Information

Japanese Laid-Open Patent Application No. 5022506 (Patent Document 1) discloses a warning method for issuing a warning relating to poor physical health caused by heatstroke. In the warning method: heatstroke in a monitored person is evaluated based on biological information pertaining to the monitored person, who is a worker, and environment information such as humidity; and a warning relating to the heatstroke is issued to the monitored person or to another monitored person who works in the surroundings of the aforementioned monitored person.

In such a warning method, although it is possible to reduce heatstroke in the monitored person and in surrounding monitored persons within a work area, there is a concern that a supervisor or a medical practitioner who is present outside of the work area will be unable to implement an appropriate treatment in a suitable period for a monitored person who is experiencing heatstroke.

Additionally, in Patent Document 1, no consideration is given whatsoever to the matter of evaluating or reporting illness or injury of the monitored person.

The present invention is focused on the aforementioned problems, it being an object of the present invention to provide a warning method and a warning system in which an appropriate treatment can be implemented in a suitable period in response to any poor physical health, illness, or injury of a monitored person.

SUMMARY

The present invention relates to a warning method in which: at least one of biological information pertaining to a monitored person and environment information pertaining to surroundings of the monitored person is acquired as information to be used in evaluating a degree of risk pertaining to any poor physical health, illness, or injury of the monitored person; a degree of risk relating to the poor physical health, illness, or injury of the monitored person is calculated based on the acquired information; and the scope of a warning relating to the poor physical health, illness, or injury of the monitored person is changed based on the extent of the calculated degree of risk.

According to the present invention, it is possible for an appropriate treatment to be implemented in a suitable period in response to any poor physical health, illness, or injury of a monitored person.

BRIEF DESCRIPTION OF THE DRAWINGS

Referring now to the attached drawings which form a part of this original disclosure.

DETAILED DESCRIPTION

Embodiments of the present invention are described below with reference to the accompanying drawings.

Figure 1:
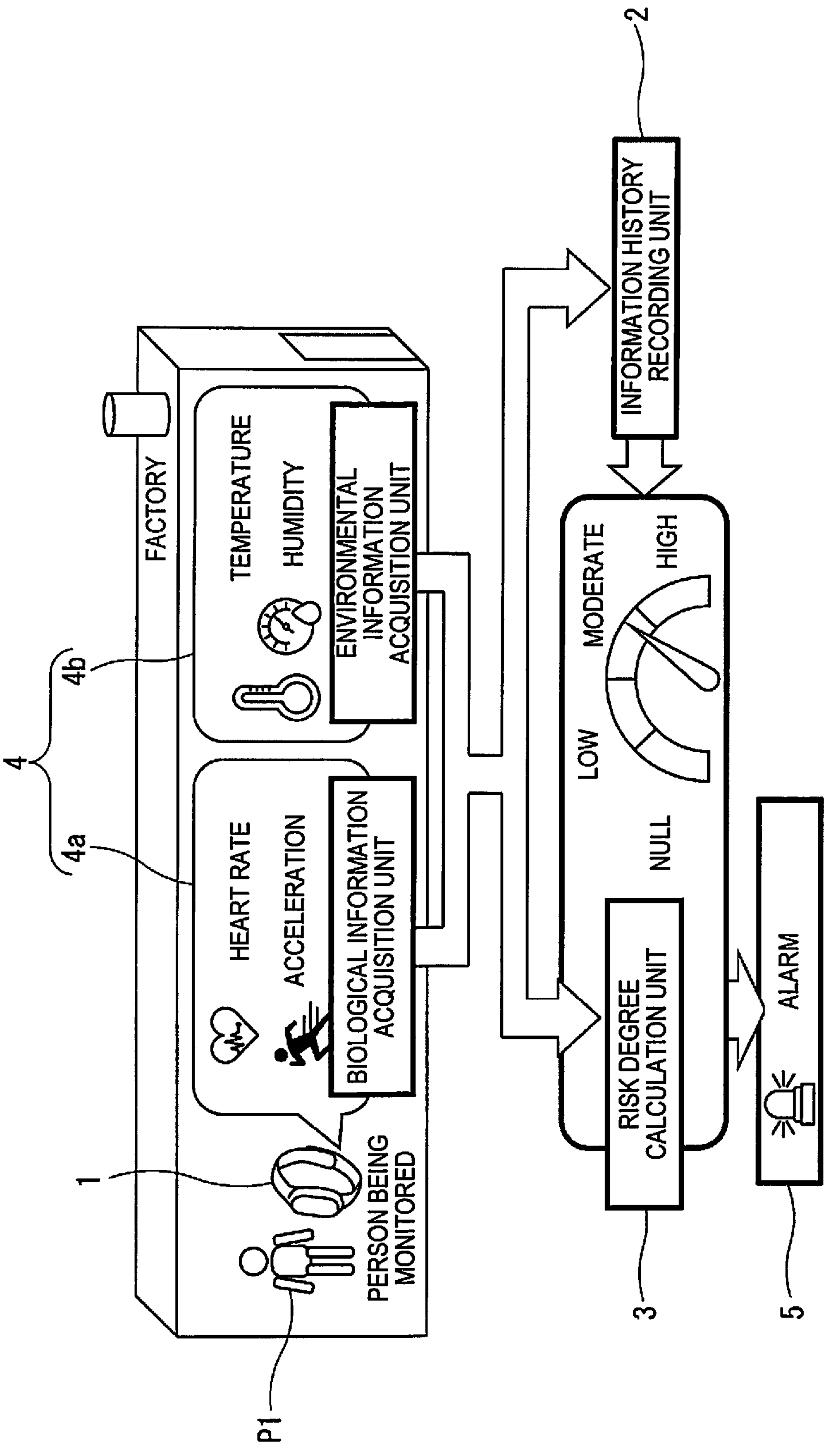
FIG. 1 is a schematic diagram of a warning system according to one example.

FIG. 1 shows a warning system in which: calculations are performed in regard to a degree of risk pertaining to heatstroke, which is one symptom of poor physical health, for individual monitored persons P1, who are workers at a factory; and the scope of a warning is changed based on the extent of the calculated degree of risk.

Heatstroke involves symptoms that are experienced as a result of water in a body being lost through perspiration during exercise or job-related work in a high-temperature and high-humidity environment and a balance of water and salt in the body being disturbed, whereby regulatory functions in the body decline. Examples of such symptoms include dizziness, headache, cramps (heat cramps), and fainting (fainting from heat). For example, heat cramps occur as a result of a perspiration action being promoted and the balance of water and salt in the body being disturbed when skin temperature rises during exercise or work in a high-temperature and high-humidity environment. Fainting from heat occurs as a result of heart rate increasing, and blood not readily flowing to the brain due to a skin vasodilation reaction being promoted and the flow rate of the blood decreasing in association with the increase in heart rate, when the skin temperature rises during exercise or work in a high-temperature and high-humidity environment in the same manner. Heatstroke that includes heat cramps and fainting from heat is difficult to recognize for a person experiencing these symptoms, and it is difficult to implement an appropriate treatment in a suitable period with respect to such heatstroke.

This warning system comprises: a wearable watch 1 (referred to below as a "watch 1"), which is a portable terminal that can be worn around a wrist; an information history recording unit 2 that records a history of information transmitted from the watch 1, the information history recording unit 2 being provided to a cloud server; a risk degree calculation unit 3 that calculates a degree of risk of heatstroke based on the information transmitted from the watch 1, the risk degree calculation unit 3 being provided to the cloud server; and an alarm 5, which is a warning-issuing means that issues a warning based on the extent of the degree of risk calculated by the risk degree calculation unit 3.

The watch 1 is configured to be provided with a heart rate sensor, a skin temperature sensor, a blood pressure sensor, a perspiration sensor, a temperature sensor, a humidity sensor, and an acceleration sensor. The temperature sensor and the humidity sensor may be provided to suitable positions within the factory, e.g., positions near a monitored person P1, rather than being provided to the watch 1. The watch 1 has an information acquisition unit 4 that acquires information to be used in evaluating the degree of risk of heatstroke in the monitored person P1. The information acquisition unit 4 has: a biological information acquisition unit 4*a* that acquires biological information pertaining to the monitored person P1, specifically a heart rate (average value of heart rate) and an acceleration in the present example; and an environment information acquisition unit 4*b* that acquires environment information pertaining to surroundings of the monitored person P1, specifically temperature and humidity in the present example. The biological information acquisition unit 4*a* and the environment information acquisition unit 4*b* do not need to be built into the watch 1 and may instead be provided to the cloud server.

The biological information is fundamentally configured from: startup-time biological information that is measured while the watch 1 is starting up, such as heart rate, skin temperature, blood pressure, perspiration amount, and exercise intensity; basic information pertaining to the monitored person P1, such as height, weight, and body fat percentage; and acceleration, which is used in evaluating a workload of the monitored person P1. Any combination of at least one or more of these parameters can be used.

As pertains to blood pressure, for example, persons with high blood pressure often refrain from consuming salt, and in order for the body to maintain a balance of salt and water, the excess of water relative to the salt deficit is discharged from the body, as a result of which persons with high blood pressure tend to have a lower water content in the body than persons with average blood pressure. Therefore, persons with high blood pressure more readily experience heat cramps, which are one symptom of heatstroke, as a result of water being lost through perspiration during work in a high-temperature and high-humidity environment and the balance of salt and water being disturbed. Thus, blood pressure can be used as biological information relating to heatstroke.

Exercise intensity indicates the load and difficulty of exercise and is calculated based on the heart rate.

The environment information is fundamentally configured from temperature (air temperature), humidity, wind speed, insolation amount, radiant heat amount, and weather. Any combination of at least one or more of these parameters can be used. The wind speed, insolation amount, radiant heat amount, and weather are acquired from an application installed in the watch 1.

The information history recording unit 2 records a history of the heart rate and the acceleration that are transmitted from the biological information acquisition unit 4*a*, as well as a history of the temperature and the humidity that are transmitted from the environment information acquisition unit 4*b*, and then transmits the recorded histories to the risk degree calculation unit 3.

The risk degree calculation unit 3 calculates a degree of risk relating to heatstroke based on the heart rate and the acceleration that are transmitted from the biological information acquisition unit 4*a* and the temperature and the humidity that are transmitted from the environment information acquisition unit 4*b*. Specifically, the risk degree calculation unit 3 comprehensively evaluates the heart rate, acceleration, temperature, and humidity to quantify one degree of risk relating to heat stroke as a numeric value within the range of, e.g., 0-100, thereby calculating the degree of risk. The degree of risk increases commensurately with any increase in heart rate, acceleration, temperature, or humidity. More specifically, the heart rate readily increases in high-temperature and high-humidity environments where the temperature and the humidity are comparatively high, and the heart rate also increases along with job-related load when the acceleration increases. Thus, as described above, blood does not readily move to the brain due to a skin vasodilation reaction being promoted, and fainting from heat, which is one symptom of heatstroke, readily occurs.

The risk degree calculation unit 3 also assesses whether the calculated degree of risk corresponds to any of "none," "low," "moderate," or "high." Specifically, if the degree of risk is less than a first threshold value, then the risk degree calculation unit 3 assesses that the degree of risk is "none." If the degree of risk is greater than the first threshold value and equal to or less than a second threshold value that is higher than the first threshold value, then the risk degree calculation unit 3 assesses that the degree of risk is "low." If the degree of risk is greater than the second threshold value and equal to or less than a third threshold value that is higher than the second threshold value, then the risk degree calculation unit 3 evaluates that the degree of risk is "moderate." If the degree of risk is greater than the third threshold value, then the risk degree calculation unit 3 assesses that the degree of risk is "high."

In cases where the degree of risk is equal to or less than the first threshold value, cases where the degree of risk is equal to or less than the second threshold value after having been assessed to be greater than the first threshold value, and cases where the degree of risk is equal to or less than the third threshold value after having been assessed to be greater than the second threshold value (refer to FIG. 2), the risk degree calculation unit 3 modifies the first to third threshold values based on the heart rate, acceleration, temperature, and humidity from the information history recording unit 2. Specifically, in the cases described above, the risk degree calculation unit 3 modifies the first to third threshold values for determining the scope of the warning to values that account for individual differences in heart rate and extent of acclimation to summer heat, i.e., the extent to which the body is accustomed to heat.

The alarm 5 changes the scope of the warning based on the assessment of the degree of risk made by the risk degree calculation unit 3. More specifically, if the degree of risk is assessed to be "none" by the risk degree calculation unit 3, then the alarm 5 does not activate. If the degree of risk is assessed to be "low" by the risk degree calculation unit 3, then the alarm 5 issues the warning to the watch 1 of the monitored person P1. If the degree of risk is assessed to be "moderate" by the risk degree calculation unit 3, then the alarm 5 issues the warning to a supervisor of the monitored person P1, i.e., a person who is a superior of the monitored person P1, gives instructions to the monitored person P1, and manages processes. If the degree of risk is assessed to be "high" by the risk degree calculation unit 3, then the alarm 5 issues the warning to a medical facility, i.e., a location where medical practice is carried out, or a medical practitioner, i.e., a person who conducts medical practice and has a medical license.

Next, a warning method using the warning system of the present example shall be described with reference to FIG. 2.

First, in step S1, the biological information acquisition unit 4*a* acquires the heart rate and the acceleration, and the environment information acquisition unit 4*b* acquires the temperature and the humidity.

Next, in step S2, the risk degree calculation unit 3 calculates the degree of risk pertaining to heatstroke based on the heart rate, acceleration, temperature, and humidity.

In step S3, following calculation of the degree of risk, the calculated degree of risk is compared with the first threshold value. If the degree of risk is equal to or less than the first threshold value, then the risk degree calculation unit 3 assesses that the degree of risk is "none," proceeds to step S9 to acquire histories of the heart rate, acceleration, temperature, and humidity from the information history recording unit 2, and then modifies the first to third threshold values based on the histories in step S10 before returning to step S1.

If the degree of risk is greater than the first threshold value, the risk degree calculation unit 3 assesses that the degree of risk is "low," and in step S4, the alarm 5 issues the warning to the monitored person P1. The monitored person P1 thereby takes measures against heatstroke such as hydrating or resting.

Next, in step S5, the degree of risk is compared with the second threshold value. If the degree of risk is equal to or less than the second threshold value, then the risk degree calculation unit 3 proceeds to step S9 to acquire histories of the heart rate, acceleration, temperature, and humidity from the information history recording unit 2, and then modifies the first to third threshold values based on the histories in step S10 before returning to step S1. If the degree of risk is greater than the second threshold value, then the risk degree calculation unit 3 assesses that the degree of risk is "moderate," and in step S6, the alarm 5 issues the warning to the supervisor. Specifically, in step S6, the alarm 5 issues the warning to a portable terminal held by the supervisor, the portable terminal being, e.g., a wearable watch or a smartphone. The supervisor thereby gives a heatstroke-related instruction to the monitored person P1.

Next, in step S7, the degree of risk is compared with the third threshold value. If the degree of risk is equal to or less than the third threshold value, then the risk degree calculation unit 3 proceeds to step S9 to acquire histories of the heart rate, acceleration, temperature, and humidity from the information history recording unit 2, and then modifies the first to third threshold values based on the histories in step S10 before returning to step S1.

If the degree of risk is greater than the third threshold value, the risk degree calculation unit 3 assesses that the degree of risk is "high," and in step S8, the alarm 5 issues the warning to a medical facility or a medical practitioner. Specifically, the alarm 5 issues the warning to a portable terminal located at the medical facility or held by the medical practitioner, the portable terminal being, e.g., a wearable watch or a smartphone. The medical facility or the medical practitioner thereby prepares an ambulance for the factory.

In the present example as described above, the risk degree calculation unit 3: comprehensively evaluates the heart rate, acceleration, temperature, and humidity acquired by the information acquisition unit 4 to quantify these items of information, thereby calculating a degree of risk relating to heatstroke; and compares the calculated degree of risk with the first to third threshold values, thereby assessing whether the degree of risk is "low," "moderate," or "high." If the degree of risk is assessed to be "low," then the alarm 5 issues the warning to the monitored person P1. If the degree of risk is assessed to be "moderate," then the alarm 5 issues the warning to the supervisor. If the degree of risk is assessed to be "high," then the alarm 5 issues the warning to the medical facility or the medical practitioner.

Comprehensively evaluating the heart rate, acceleration, temperature, and humidity to assess the degree of risk pertaining to heatstroke in a manner suited to an individual in this manner makes it possible to take appropriate measures in a suitable period for the monitored person P1. More specifically, if the warning is issued to the supervisor when any one parameter from among the heart rate, acceleration, temperature, or humidity exceeds the second threshold value, then the supervisor will need to visit a work site repeatedly owing to false reports notifying the supervisor about a monitored person P who has not reached a state of heatstroke. However, calculating the degree of risk as described in the present example allows the supervisor to carry out the minimum required confirmation with respect to a monitored person P1 having an abnormally high likelihood of heatstroke. Additionally, if the warning is issued to the medical facility or the medical practitioner when any one parameter from among the heart rate, acceleration, temperature, or humidity exceeds the third threshold value, then ambulances will often be unnecessarily dispatched due to false reports. However, calculating the degree of risk as described in the present example allows ambulances to be dispatched only when this measure is necessary. Therefore, it is possible to efficiently implement measures for a monitored person P1 having a high likelihood of heatstroke while reducing the task burden on the supervisor, the medical facility, or the medical practitioner.

Appropriately applying weighting to the heart rate, acceleration, temperature, and humidity makes it possible to implement measures for the monitored person P1 with even greater efficiency. For example, lowering the weighting for the temperature and raising the weighting for the heart rate with respect to a monitored person P1 who is acclimated to summer heat improves the accuracy of calculating the degree of risk pertaining to heatstroke in the monitored person P1, thus making it possible for the supervisor, the medical facility, or the medical practitioner to more efficiently implement measures for the monitored person P1 while reducing the number of instances of false reports.

In the present example, the risk degree calculation unit 3 modifies the first to third threshold values for determining the scope of the warning based on the histories pertaining to the heart rate and the acceleration, which are items of biological information.

Accordingly, because the first to third threshold values account for individual differences in heart rate between monitored persons P1 during work, the degree of risk pertaining to heatstroke in individual monitored persons P1 is more accurately calculated. Therefore, false reports of warnings relating to heatstroke will be fewer, and the burden on the supervisor, the medical facility, or the medical practitioner can be reduced.

In the present example, the first to third threshold values for determining the scope of the warning are modified based on the histories pertaining to the temperature and the humidity, which are items of environment information.

Accordingly, because the first to third threshold values are set in consideration of the extent to which the monitored person P1 is acclimated to summer heat, the first to third threshold values are set higher for monitored persons P1 who have a higher tolerance for heat. Therefore, the number of instances in which the supervisor, the medical facility, or the medical practitioner implements measures for a monitored person P1 who is experiencing heatstroke decreases, and the burden on the supervisor or the like can be reduced.

Figure 3:
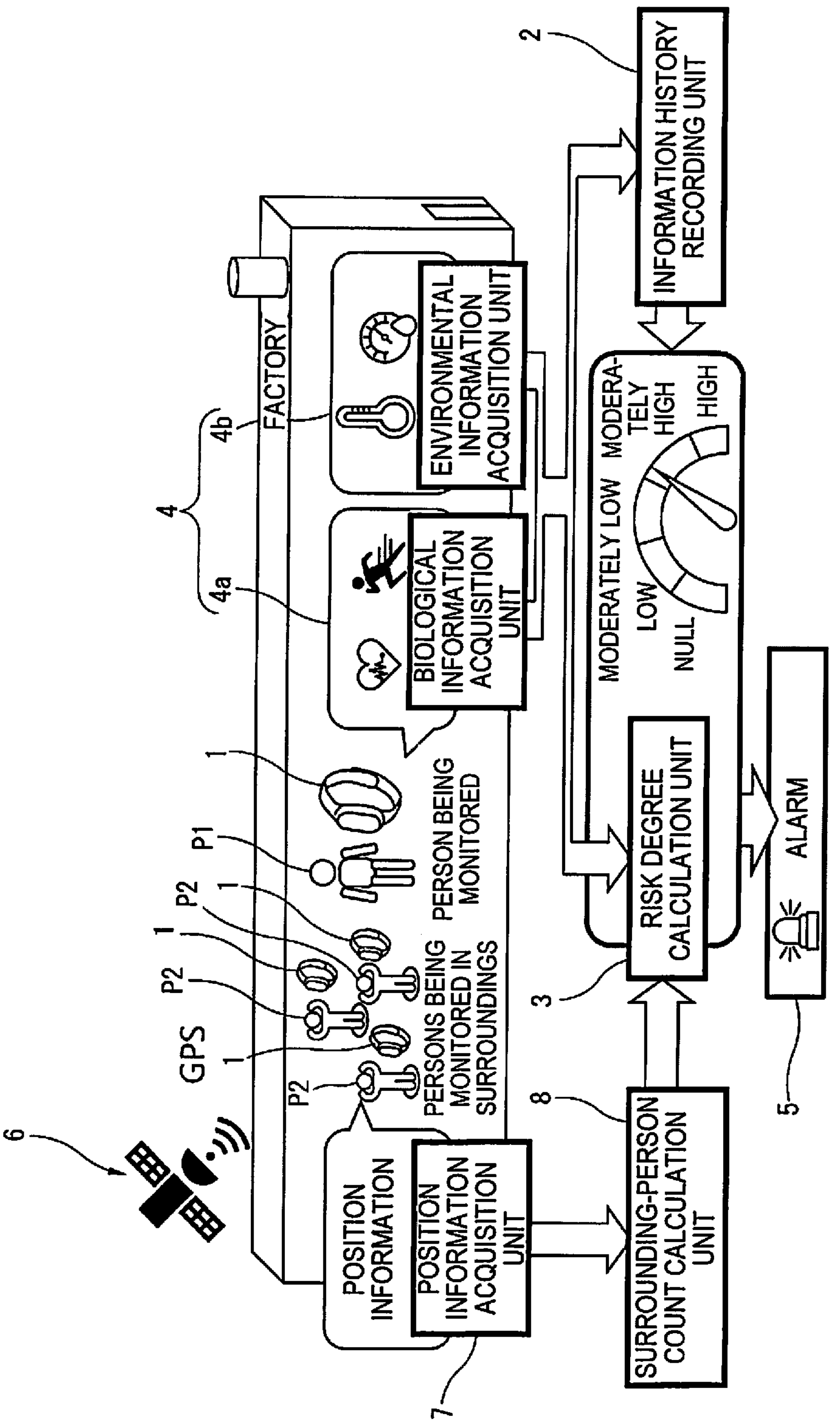
FIG. 3 is a schematic diagram of a warning system according to a second example.

FIG. 3 schematically shows a warning system according to a second example. In the second example, in a state in which one monitored person P1 and a plurality of monitored persons P2 (three monitored persons P2 in the present example) who are working in the surroundings of the aforementioned monitored person are present, the degree of risk pertaining to heatstroke in the one monitored person P1 is calculated. Additionally, in the present example, a GPS 6, a position information acquisition unit 7, and a surrounding-person count calculation unit 8 are newly provided. Further-more, in the present example, the level "moderate" indicating the extent of the degree of risk in the first example is further classified into "moderately low" and "moderately high" according to a fourth threshold value, which shall be described later.

The GPS 6 detects the positions of the plurality of monitored persons who are working in the factory, i.e., the positions of the one monitored person P1 and the surrounding three monitored persons P2, and transmits the detected positions to the position information acquisition unit 7. It is also permissible to acquire the positions of the monitored persons P1, P2 using Bluetooth® or a beacon and transmit the acquired positions to the position information acquisition unit 7 in lieu of using the GPS 6.

The position information acquisition unit 7 is provided to the watch 1. The position information acquisition unit 7 acquires the positions of the four monitored persons P1, P2 who were detected by the GPS 6.

The surrounding-person count calculation unit 8 calculates a surrounding-person count, i.e., the number of monitored persons P2 who are located in the surroundings of the one monitored person P1, based on the positions of the four monitored persons P1, P2 in the position information acquisition unit 7.

The risk degree calculation unit 3 modifies the first to fourth threshold values based on the surrounding-person count acquired from the surrounding-person count calculation unit 8. For example, in cases where there are three surrounding persons, the chance that heatstroke will be overlooked in the one monitored person P1, who is the subject for detection of heatstroke, will be lower than in cases where there are one or two surrounding persons; thus, in the former cases, the first to fourth threshold values are set to comparatively high values. However, in cases where there is one surrounding person, the chance that heatstroke will be overlooked in the one monitored person P1 will be higher than in cases where there are two or three surrounding persons; thus, in the former cases, the first to fourth threshold values are set to comparatively low values.

If the degree of risk calculated based on the heart rate, acceleration, temperature, and humidity is greater than the second threshold value and equal to or less than the fourth threshold value, which is higher than the second threshold value, then the risk degree calculation unit 3 assesses that the degree of risk is "moderately low." If the degree of risk is greater than the fourth threshold value and equal to or less than the third threshold value, which is higher than the fourth threshold value, then the risk degree calculation unit 3 assesses that the degree of risk is "moderately high."

In the present example as described above, the surrounding-person count calculation unit 8 calculates the surrounding-person count, i.e., the number of monitored persons P2 who are present in the surroundings of the one monitored person P1, based on position information pertaining to the plurality of monitored persons P1, P2. The risk degree calculation unit 3 modifies the first to fourth threshold values for determining the scope of the warning based on the calculated surrounding-person count.

Accordingly, in cases where the surrounding-person count is comparatively high, because the surrounding monitored persons P2 will readily discover and address the monitored person P1 who is experiencing heatstroke, the first to fourth threshold values are set to high values, thereby making it possible to reduce the burden on the supervisor, the medical facility, or the medical practitioner.

In a third example, differently with respect to the examples described above, calculations are performed in regard to a degree of risk pertaining to heart attack, which is one symptom of illness, and the scope of the warning is changed based on the extent of the calculated degree of risk. In the present example, the risk degree calculation unit comprehensively evaluates the acceleration, heart rate, and blood pressure acquired by the biological information acquisition unit to quantify these items of information, thereby calculating the degree of risk pertaining to heart attack. The acceleration, heart rate, and blood pressure are used as parameters in this instance because in cases where, for example, a state of zero acceleration has continued for a prescribed time, there is a possibility that the monitored person has collapsed in a work area within the factory, and if the heart rate and the blood pressure are comparatively high in such circumstances, then there is a concern that the monitored person is experiencing a heart attack.

Figure 2:
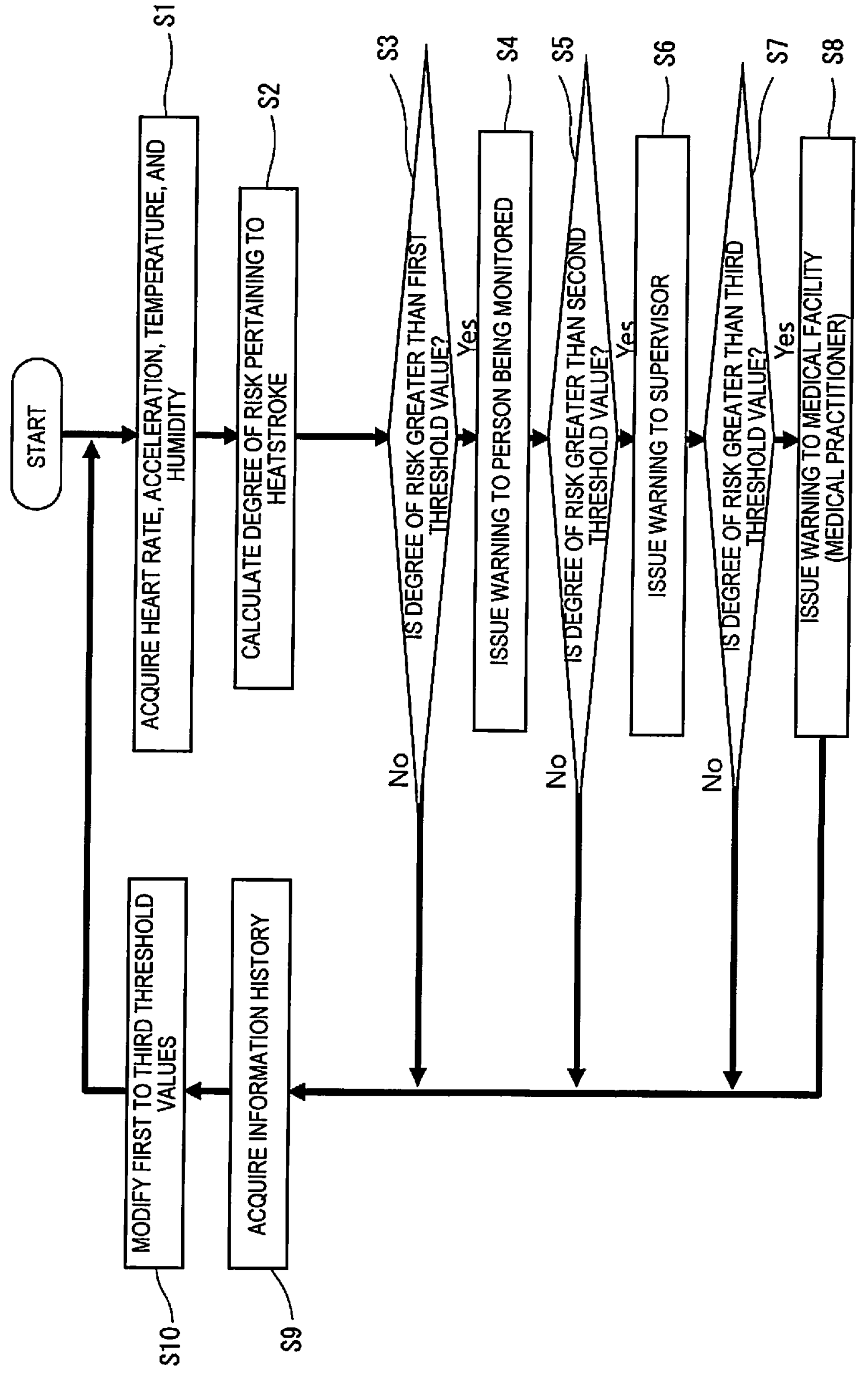
FIG. 2 is a flow chart showing a warning method in which the warning system according to the one example is used.

The calculation of the degree of risk and the issuance of the warning in the third example are carried out using the same procedure as that in the flow chart shown in FIG. 2 in the first example.

In a fourth example, differently with respect to the examples described above, calculations are performed in regard to a degree of risk pertaining to lower back pain, which is one symptom of injury, and the scope of the warning is changed based on the extent of the calculated degree of risk. In the present example, the risk degree calculation unit calculates the degree of risk pertaining to lower back pain by using the acceleration acquired by the biological information acquisition unit. The acceleration is used as a parameter in this instance due to often being higher for a monitored person who is performing work to lift and lower comparatively heavy goods than for a monitored person who is not associated with this work, and if the state of increased acceleration continues for a prescribed time, then the burden applied to the lower back can be predicted.

The calculation of the degree of risk and the issuance of the warning in the fourth example are carried out using the same procedure as that in the flow chart shown in FIG. 2 in the first example.

The examples described above illustrate cases where the scope of the warning is changed based on the biological information, including the heart rate and the acceleration, and the environment information, including the temperature and the humidity. However, it is permissible for the scope of the warning to be changed based on only either one of the biological information or the environment information. For example, the heart rate, which is an item of biological information, is suited for evaluating fainting from heat, which is one symptom of heatstroke, as described above; thus, it is possible to assess the degree of risk pertaining to heatstroke even if only biological information is used. Moreover, as regards, e.g., the temperature, which is an item of environment information, it is necessary to work in a high-temperature environment to a greater extent in, e.g., a welding area in the factory than in other areas such as an assembly area, and suitably setting the threshold values based on information pertaining to the temperature within the factory in consideration of the high temperatures makes it possible to assess the degree of risk pertaining to heatstroke even if only environment information is used.

The invention claimed is:

1. A warning method comprising:

acquiring at least one of biological information pertaining to one of a plurality of monitored persons and environment information pertaining to surroundings of the one of the plurality of monitored persons as acquired information to be used in evaluating a degree of risk pertaining to at least one of poor physical health, illness, and injury of the one of the plurality of monitored persons;

calculating the degree of risk relating to the at least one of poor physical health, illness, and injury of the one of the plurality of monitored persons based on the acquired information;

changing a scope of a warning relating to the at least one of poor physical health, illness, and injury of the one of the plurality of monitored persons based on an extent of the degree of risk that was calculated;

acquiring position information pertaining to the plurality of monitored persons;

calculating a surrounding-person count corresponding to others of the plurality of monitored persons who are present in the surroundings of the one of the plurality of monitored persons based on the position information; and setting a threshold value pertaining to the scope of the warning to a lower value as the surrounding-person count decreases.

2. The warning method according to claim 1, further comprising recording a history of the biological information, and modifying the threshold value pertaining to the scope of the warning based on the history of the biological information.

3. The warning method according to claim 1, wherein the biological information includes at least one of a heart rate, a skin temperature, a blood pressure, a perspiration amount, an exercise intensity, a height, a weight, or a body fat percentage of the one of the plurality of monitored persons.

4. The warning method according to claim 1, wherein the environment information includes at least one of a temperature, a humidity, a wind speed, an insolation amount, a radiant heat amount, and a weather.

5. The warning method according to claim 1, further comprising transmitting a warning notification to a portable terminal held by the one of the plurality of monitored persons or by a person included in the scope of the warning.

6. The warning method according to claim 1, wherein the surrounding-person count is calculated based on the positions of the others of the plurality of monitored persons who are present in the surroundings around the position of the one of the plurality of monitored persons.

7. The warning method according to claim 1, wherein the surrounding-person count is the number of the others of the plurality of monitored persons who are working in a same work area.

8. A warning system that issues a warning relating to any one of poor physical health, illness, or injury of one of a plurality of monitored persons, the warning system comprising:

an information acquisition unit configured to acquire at least one of biological information pertaining to the one of the plurality of monitored persons and environment information pertaining to surroundings of the one of the plurality of monitored persons;

a risk degree calculation unit configured to calculate a degree of risk relating to the at least one poor physical health, illness, or injury of the one of the plurality of monitored persons based on the information acquired by the information acquisition unit;

a warning-issuing means that issues the warning based on an extent of the degree of risk calculated by the risk degree calculation unit;

a position information acquisition unit configured to acquire position information pertaining to the plurality of monitored persons; and a surrounding-person count calculation unit configured to calculate a surrounding- person count corresponding to others of the plurality of monitored persons who are present in the surroundings of the one of the plurality of monitored persons based on the position information acquired by the position information acquisition unit, the warning-issuing means changing a scope of the warning according to the extent of the degree of risk, and the risk degree calculation unit setting a threshold value pertaining to the scope of the warning to a lower value as the surrounding-person count decreases.

* * * * *